United States Patent Office 3,845,043
Patented Oct. 29, 1974

---

3,845,043
PREVENTING REVERSION DURING PREPARATION OF NUCLEUS ESTER SALTS
Lowell D. Hatfield, Indianapolis, Ind., assignor to Eli Lilly and Company, Indianapolis, Ind.
Filed Nov. 30, 1971, Ser. No. 203,399
Int. Cl. C07d 99/16, 99/24
U.S. Cl. 260—243 C                 16 Claims

ABSTRACT OF THE DISCLOSURE

Process for preventing reversion of an imino halide of a 7-acylamidodesacetoxycephalosporinate ester to a 7-acylamidodesacetoxycephalosporinate ester during treatment of the imino halide with an alcohol or thiol by reacting the imino halide with a β-disubstituted primary aliphatic alcohol or thiol in an inert organic liquid in the presence of hydrogen halide.

INTRODUCTION

This invention relates to processes for preparing cephalosporin compounds. More particularly, this invention provides an improved process for preparing cephalosporin nucleus ester salts which are useful as intermediates in processes of preparing cephalosporin antibiotics.

BACKGROUND OF THE INVENTION (a) General Cephalosporin History

Cephalosporin C, obtained by fermentation, has been defined as having the following structure:

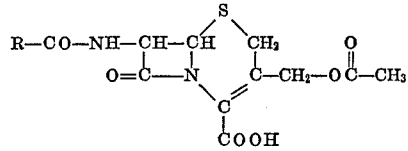

where R is HOOC—CH(NH$_2$)—(CH$_2$)$_3$—. It is also known as 7-(5'-aminoadipamido)cephalosporanic acid. It has weak antibiotic activity, but it is important as a source of cephalosporin C nucleus, i.e., 7-aminocephalosporanic acid (7-ACA), having the structural formula

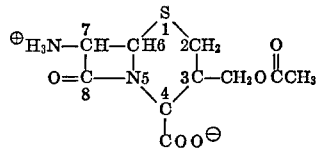

shown herein zwitterionic form, although anionic and cationic salts may be formed and used. Antibiotics such as cephalothin and cephaloridine are prepared from 7-ACA by known methods. Various derivatives of 7-ACA based antibiotics are made by acylating the 7-amino group of 7-ACA with appropriate acyl acids, halides, or other reactive form of such acyl groups and/or by replacing the acetoxy group attached to the 3-methyl carbon atom with appropriate nucleophilic groups now well documented in the literature.

In continued research, desacetoxycephalosporin compounds, i.e., compounds of the structure

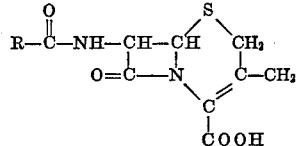

where R is the residue of the acyl group have been prepared. An important known antibiotically active compound in this class is cephalexin, an orally active cephalosporin antibiotic. Morin and Jackson (U.S. Pat. 3,275,626) discovered a process for preparing the desacetoxycephalosporanic acid derivatives by rearranging a penicillin sulfoxide ester to the corresponding desacetoxycephalosporin ester, and then removing the ester group. Desacetoxycephalosporanic acid derivatives antibiotics are thus obtainable from a penicillin starting material. The compounds are sometimes, for convenience, referred to as being derivatives of the nucleus compound, 7-aminodesacetoxycephalosporanic acid (7-ADCA), having the structure

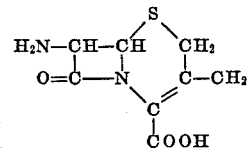

(b) Cephalosporin and Penicillin Cleavage Process Prior Art

Various publications such as B. Fetig et al., *Helv. Chim. Acta*, Vol. 51, 1,108 (1968); H.W.O. Weissenburger and M. G. Van Der Haven, *Rec. Trav. Chim.*, under 89, 1,081 (1969); G. R. Fosker, et al., *J. Chem. Soc.* (C), 1971, p. 1917; and R. R. Chauvette et al., *J. Org. Chem.* 36, 1,259 (1971); and patents such as U.S. 3,234,223, 3,575,970, and 3,549,628 describe the use of phosphorus pentachloride in the chemical removal of the side chain acyl group from penicillins and cephalosporins. These processes provide the respective bicyclic nuclei, 6-aminopenicillanic acid (6-APA), 7-aminocephalosporanic acid (7-ACA), 7-aminodesacetoxycephalosporanic acid (7-ADCA), or derivatives thereof, for example, esters and salts.

The reaction scheme used to illustrate the mechanism of the PCl$_5$ cleavage process is outlined by the partial chemical structures below. The amide function of the side chain is converted to an imino chloride (I) upon reaction with PCl$_5$ and base (Step 1). The imino chloride (I) reacts subsequently with an alcohol to form an imino ether (II) (Step 2), which in turn is hydrolyzed to the nucleus (IV) and the side chain fragment (III) (Step 3). The nucleus (IV) is usually isolated from its reaction mixture as a zwitterion or as a sulfonic salt when the carboxyl group is blocked with an ester group. As indicated in the above references, step 1 occurs over a temperature range of —40° C. to 60° C. depending upon the particular cleavage reactants. Step 2 required very large volumes of alcohol; and the temperature range of —65° C. to —10° C. necessary for optimum alcoholysis probably reflects the instability of the penicillin or cephalosporin nucleus under the acidic conditions in alcohol solution.

(1)

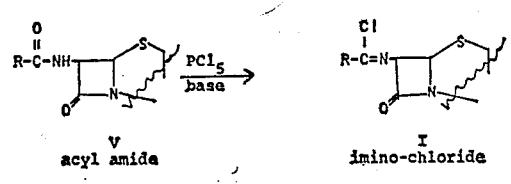

V                    I
acyl amide          imino-chloride (2)

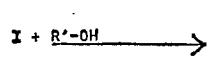

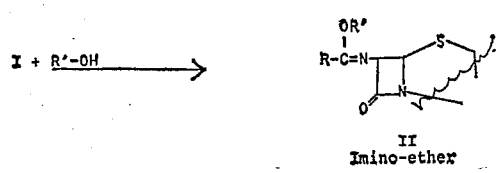

II
imino-ether

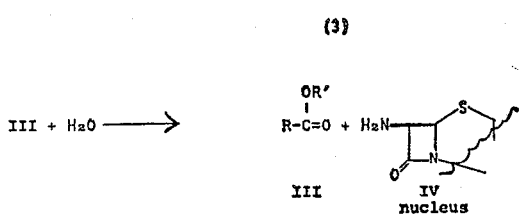

Some of these processes are used commercially to prepare intermediates for use in manufacturing various penicillin or cephalosporin antibiotics, for example, ampicillin, cephalothin, cephaloridine, cephaloglycin, cephalexin and the like. Those in the art are seeking ways to produce the needed penicillin or cephalosporin nucleus compounds more efficiently.

It is an object of the present invention to provide a process for making penicillin and cephalosporin nuclei ester salts more efficiently than has previously been possible.

It is a specific object of this invention to provide a versatile process for making solid, crystalline 7-aminodesacetoxycephalosporin ester hydrohalide salts without the need for use of water in the reaction mixture, which process can be used over a broad range of temperatures with efficient use of the reagents involved. Other objects, aspects, and advantages of the process of this invention will become apparent from the reading of the specification which follows.

SUMMARY OF THE INVENTION

This invention provides a process for preventing reversion of an imino halide of a 7-acylamidodesacetoxycephalosporin ester to a 7-acylamidodesacetoxycephalosporin ester (V) during treatment of the imino halide (I) with an alcohol or thiol by reacting the imino halide with a β-disubstituted primary aliphatic alcohol in an inert organic liquid diluent in the presence of hydrogen halide. When specific esters are used, this invention provides an improved process for preparing solid, crystalline 7-aminodesacetoxycephalosporinate ester hydrohalide salts by reacting the imino halide with the β-disubstiuted primary aliphatic alcohol in the inert organic liquid solvent in the presence of hydrogen halide to form the 7-aminodesacetoxycephalosporinate ester hydrohalide salt which precipitates and is easily separated from its organic solvent reaction mixture by conventional means. For this purpose the p-nitrobenzyl ester is preferred. With this improved process, gross excesses of alcohol are not needed. An optimum mole ratio of from 3 to 6 moles of the β-disubstituted primary aliphatic alcohol per mole of the imino halide reactant is all that is required.

DETAILED DESCRIPTION OF THE INVENTION

Figure 1:
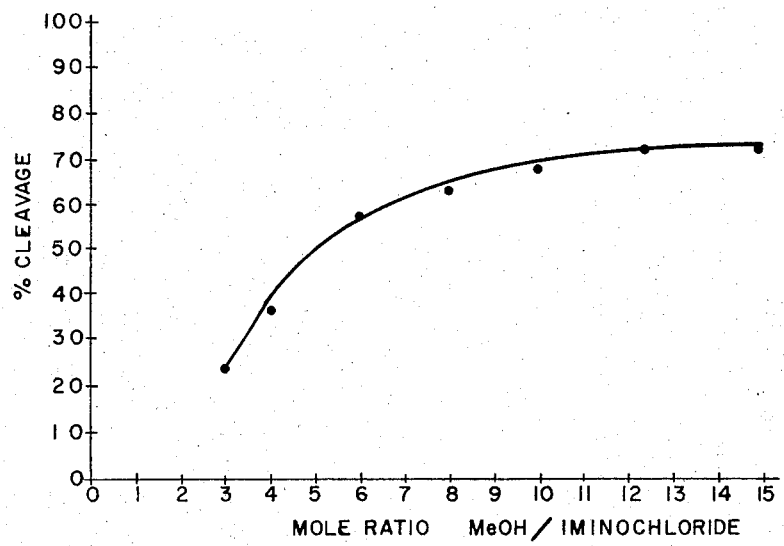
FIG. 1 is a graph plotting moles of methanol (abscissa) against the percent cleavage product (ordinate) illustrating the effect of the amount (in moles) of methanol on the yields of the desired nucleus ester salt product.
Figure 2:
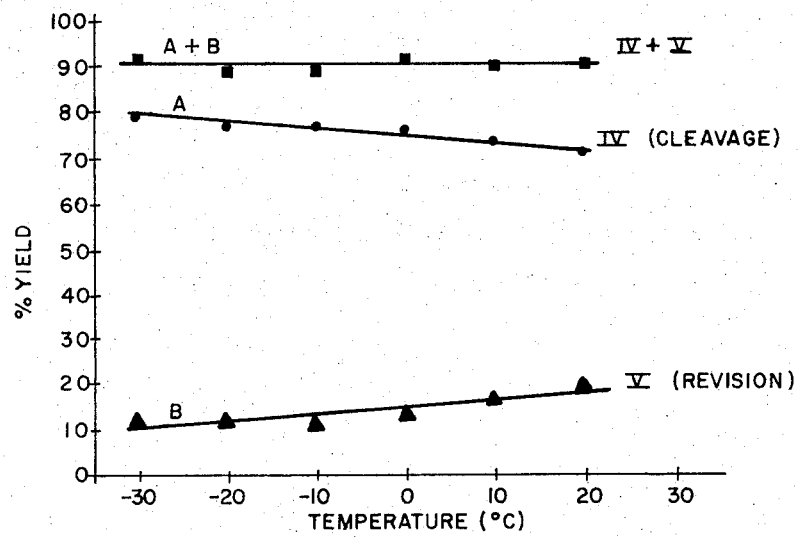
FIG. 2 shows in three line graphs, plotting temperature in degrees Centigrade (abscissa) against percentage yield of the products obtained (ordinate), showing the effect of temperature on the use of methanol to effect conversion of the imino chloride of p-nitrobenzyl 7-phenoxyacetamido-3-methyl-3-cephem - 4 - carboxylate (I), to cleavage product IV [p-nitrobenzyl 7-amino-3-methyl-3-cephem-4-carboxylate hydrochloride], line A, or reversion product V [p-nitrobenzyl 7-phenoxyacetamido-3-methyl-3-cephem-4-carboxylate], line B. Lines $A+B$ show the sum of yields of cleavage product IV and reversion product V.

According to this invention, I have discovered a process for preventing reversion of an imino halide of a 7-acylamidodesacetoxycephalosporin ester to a 7-acylamidodesacetoxycephalosporin ester during treatment of the imino halide with an alcohol or thiol which comprises reacting the imino halide in an inert organic liquid diluent in the presence of hydrogen halide with a β-disubstituted primary aliphatic alcohol or thiol of the formula

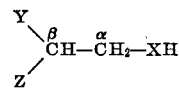

wherein X is oxygen or sulfur and (i) each of Y and Z is alkyl such that the alcohol or thiol has from 4 to about 12 carbon atoms, or (ii) Y and Z are taken together with the carbon atoms to which they are bonded to denote a cycloalkyl group having from 5 to 8 ring forming carbon atoms. I have found that a gross excess of alcohol of this type is not needed for this reaction. Preferred mole ratios are those wherein the imino halide is reacted with from 3 to 6 moles of the β-disubstituted primary aliphatic alcohol or thiol per mole of the imino halide (I) reactant. A preferred β-disubstituted primary aliphatic alcohol is isobutanol.

In a specific embodiment of this invention, I have discovered a process for making 7-aminodesacetoxycephalosporinate ester salts as easily handled, solid, crystalline materials in high yields from the imino halides of the 7-acylamidodesacetoxycephalosporinate esters when certain preferred esters are used, such as p-nitrobenzyl ester.

In this process, no water is needed. The reaction of the process can be conducted over broad temperature range of liquid process conditions without substantial effect upon the yield of the desired 7-aminodesacetoxycephalosporinate ester salt product. I have discovered how to eliminate or at least substantially curtail the reversion of the imino halide (I) to the acylamide (V), which side reaction often occurs when some alcohols are used at various temperatures as suggested by the prior art.

Application of the discovery of this invention to a process for making 7-aminodesacetoxycephalosporinate salts is advantageous when the imino halide starting material is that of a 7-acylamidodesacetoxycephalosporinate ester derived from a penicillin, and converted to a 7-acylamidodesacetoxycephalosporinate ester by the Morin/Jackson penicillin sulfoxide ester ring expansion reaction (U.S. Pat. No. 3,275,626), especially as improved by Cooper (application Ser. No. 838,697, filed July 2, 1969, now allowed) and Hatfield (U.S. Pat. No. 3,591,585). The process can also be applied to esters of desacetoxycephalosporin C (U.S. Pat. No. 3,124,576) to form the desired 7-aminodesacetoxycephalosporinate esters. Esterification methods are well known and are exemplified by procedures disclosed in the above patent references as well as in my U.S. Pat. No. 3,586,667.

The process of this invention can also be applied with advantage over prior art processes to the making of 6-aminopenicillanic acid (6-APA) ester salts from imino halides of penicillin esters and to 7-aminocephalosporanic acid (7-ACA) ester salts from imino halides of cephalosporin C and its derivatives but in such a process consideration must be given in the process conditions to the relative instability of the penicillin β-lactam ring, or to the much more complex reactions involved in processing imino halides of cephalosporin C and its derivatives.

According to this invention, I have discovered a process for preparing 7 - aminodesacetoxycephalosporinate ester hydrohalides which comprises reacting an imino halide of a 7-acylamidodesacetoxycephalosporinate ester with a β-disubstituted primary aliphatic alcohol or thiol of the formula

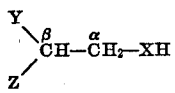

where X is oxygen or sulfur and (i) each of Y and Z is an alkyl such that the alcohol or thiol has from 4 to about 12 carbon atoms or (ii) Y and Z are taken together with a carbon atom to which they are bonded to denote a cycloalkyl group having from 5 to 8 ring forming carbon atoms, in an inert organic liquid diluent in the presence of hydrogen halide.

For reasons of economy, the imino halide (I) is preferably the imino chloride and the hydrogen halide is preferably hydrogen chloride. However, the imino halide can be the imino bromide, imino fluoride, or imino iodide. Similarly, the hydrogen halide can be hydrogen bromide, hydrogen fluoride or hydrogen iodide. It is preferred to mix and react the imino chloride reactant with from 3 to 6 moles, more preferably, about 5 moles, of the β-disubstituted primary aliphatic alcohol or thiol per mole of the imino chloride reactant in the inert organic solvent medium. The reactants can be combined by addition of the alcohol or thiol to the imino chloride reaction mixture, or by adding the imino chloride, inert organic liquid diluent, and hydrogen halide mixture to the alcohol or thiol. The hydrogen halide can be provided to the mixture by the phosphorus pentachloride or other halogenating agent which is used to prepare the imino chloride. In such case, the hydrogen chloride is generated by reaction between phosphorus pentachloride and some of the alcohol. The hydrogen halide can also be supplied to the reaction mixture by separate addition, e.g., by the addition of hydrogen chloride. At least a chemical equivalent of hydrogen halide should be used, preferably a molar excess of hydrogen halide, to insure optimum formation of the nucleus ester salt product (IV).

Examples of inert organic diluents which can be used to provide the bulk of the reaction mixture include methylene chloride, chloroform, methylchloroform, dichloroethane, carbon tetrachloride, tetrahydrofuran, dioxane, dimethoxyethane, benzene, toluene, xylene, chlorobenzene, and the like.

The imino halides of 7-acylamidodesacetoxycephalosporinate ester starting materials for the process of this invention can be obtained from a variety of sources. Natural or semisynthetic penicillin can be used to prepare these materials. The most practical penicillin for this purpose are the phenoxymethyl penicillin (penicillin V), benzyl penicillin (penicillin G), and other penicillins which are produced commercially. Numerous examples of penicillins are given in the prior art, for example, as illustrated by the Behrens U.S. Pat. Nos. 2,479,295 to 2,479,297, 2,562,407 to 2,562,411 and 2,623,876. Examples of other penicillins which can be used include 2-thienylmethyl penicillin, penicillin N, phenylisopropyl penicillin, phenoxyisopropyl penicillin, phenyl-1-ethyl penicillin and the like. In preparing penicillins for use in this process, the penicillin can be oxidized to the penicillin sulfoxide and esterified to form the penicillin sulfoxide ester. Alternatively, the penicillin can be esterified and then oxidized to form the penicillin sulfoxide ester by procedures now known. The penicillin sulfoxide ester can be converted by the Morin/Jackson rearrangement process, as improved. For example, it can be heated in the presence of a sulfonic acid to 80° C. to 150° C. in the presence of a tertiary carboxamide while removing water from the reaction mixture as disclosed by the Hatfield U.S. Pat. No. 3,591,585 to form the 7-acylamidodesacetoxycephalosporinate ester. The 7-acylamidodesacetoxycephalosporinate ester can be reacted with phosphorus pentachloride or other halogenating agent by methods described in the above referenced patents to form the imino chloride of the 7-acylamidodesacetoxycephalosporinate ester.

The ester groups for use in converting a penicillin to imino chloride of a 7-acylamidodesacetoxycephalosporin ester starting material can be any group which will assist the precipitation of the 7-aminodesacetoxycephalosporinate ester hydrohalide salt product from the substantially anhydrous organic liquid medium in which it is generated or made. Preferred starting materials could thus be described as being imino chlorides of 7-acylamidodesacetoxycephalosporinate esters of the formula

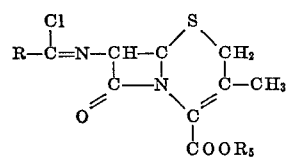

where R is a residue of the acyl group of a penicillin from which the 7-acylamidodesacetoxycephalosporinate ester was derived, and $R_5$ is the residue of an ester group selected from the group consisting of nitrobenzyl, $C_4$ to $C_6$-tertiary alkyl, $C_5$ to $C_7$-tertiary alkenyl, $C_5$ to $C_7$-tertiary alkynyl, methoxybenzyl, 2,2,2-trichloroethyl, phthalimidomethyl, succinimidomethyl, benzhydryl, phenacyl, and the like. For the obtention of solid, crystalline ester salt products we prefer to use p-nitrobenzyl ester in preparing the starting material and in this process. For reasons of economy we prefer to use the imino chloride of the p-nitrobenzyl ester of 7-phenoxyacetamido-3-methyl-3-cephem-4-carboxylate (from penicillin V) or the imino chloride of the p-nitrobenzyl 7-phenylacetamido-3-methyl-3-cephem-4-carboxylate (from penicillin G). However, we also contemplate the use of this process with the imino chloride of esters of desacetoxycephalosporin C [7-(5' - aminoadipoylamido)-3-methyl-3-cephem - 4 - carboxylic acid] and its derivatives, to form the 7-aminodesacetoxycephalosporinate ester salt products.

By this invention, I have discovered that nearly theoretical yields (over 90%) of 7-aminodesacetoxycephalosporinate ester hydrohalides can be obtainel by minimizing the reversion of the imino halides to the 7-acylamido compound from which the imino halide is made. By the use of selected alcohols or thiols, I have provided those in the penicillin and cephalosporin cleavage art with an improved process which is not sensitive to temperature variations, is more efficient in the use of alcohol or thiol, and in the preferred cases provides the desired 7-aminodesacetoxycephalosporinate ester hydrohalide salts as solid, crystalline materials which crystallize directly from the reaction mixture. This process differs from the prior art in that water is not necessary for the hydrolysis of imino ether intermediate or for product isolation.

In general, starting materials, intermediates and products are named herein by the cephalosporanic acid or desacetoxycephalosporanic acid nomenclature system. Known antibiotics are named by their generic names, if available. Sometimes, for convenience, specific starting materials, intermediates or products are named by use of the "penam" or "cepham" nomenclature system. The "penam" nomenclature for the penicillins is described by Sheehan et al. in the *Journal of the American Chemical Society* (JACS), *75*, 3292, Footnote 2 (1953). This nomenclature system was adapted to the cephalosporins by Morin et al. in *JACS*, *84*, 3400 (1962). In accordance with these systems of nomenclature "penam" and "cepham" refer respectively to the following saturated ring systems:

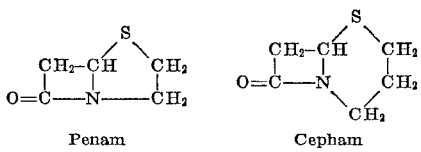

Penam        Cepham

The term "cephem" refers to the cepham ring structure containing a double bond, the position of which is indicated by an integer prefix or a prefix "Δ" with a superscript before the word "cephem" denoting the lowest numbered carbon atom to which the double bond is connected. Thus, for example, penicillin V, phenoxymethyl penicillin, can be named 6-phenoxyacetamido-2,2-dimethylpenam-3-carboxylic acid. A product of the improved process of this invention, p-nitrobenzyl 7-aminodesacetoxycephalosporinate hydrochloride, can be named p-nitrobenzyl 7-amino-3-methyl - 3 - cephem-4-carboxylate hydrochloride. The invention is further illustrated by the following detailed examples.

EXAMPLE 1

A. *In situ* preparation of imino chloride

Pyridine, 1.01 ml. (0.0125 mole) and phosphorus pentachloride (0.0115 mole) are added, with stirring, to a solution of 4.84 g. (0.0100 mole) of 4-nitrobenzyl 7-phenoxyacetamido-3-methyl-3-cephem - 4 - carboxylate in 50 ml. of methylene chloride at 15° C. The resulting solution was stirred for 2.5 hours at 20° C. in the absence of atmospheric moisture. These conditions are believed to be optimum for the conversion to the imino chloride of 4-nitrobenzyl 7-phenoxyacetamido-3-methyl - 3 - cephem-4-carboxylate. This procedure was used for generation of the solution containing 0.010 mole of the imino chloride reactant for the examples which follow. Material prepared in this manner was used for most of the following examples.

B. Isolation of imino chloride (I)

The solution from part (A) above was cooled to −15° C. and pyridine, 3.56 ml. (0.044 mole) was added followed by 5.0 ml. (0.124 mole) of absolute methanol. This solution was stirred 10 minutes at −15° to −10° C. and then poured into 50 ml. of cold, deionized water. Layers were separated and the methylene chloride layer was washed with four 50 ml. portions of cold water and then dried over anhydrous sodium sulfate. The dried solution was concentrated under vacuum and the residue was crystallized by addition of anhydrous ethyl ether. The resulting solid was filtered, washed with ethyl ether and vacuum dried at 50° C. The yield of the imino chloride of 4-nitrobenzyl 7-phenoxyacetamido-3-methyl - 3 - cephem-4-carboxylate (I) was 3.96 g. (79% yield), m.p. 121–2° C. This compound was characterized by infrared, ultraviolet, nuclear magnetic resonance, and mass spectroscopy, and by elemental analysis: $C_{23}H_{20}N_3ClO_6S$

| Percent of | C | H | N | S | Cl |
|---|---|---|---|---|---|
| Theory | 55.04 | 4.02 | 8.37 | 6.39 | 7.06 |
| Found | 54.97 | 4.14 | 8.31 | 6.58 | 7.40 |

C. Effect of various alcohols

The imino chloride, from part B, 0.50 g. (1 millimole), in 5.0 ml. of dry acetone at 25° C. was treated with 3 mmoles of water or one of the alcohols listed in Table I. In each case, any 4-nitrobenzyl 7-amino-3-methyl-3-cephem-4-carboxylate hydrochloride (IV) crystallized directly and was filtered and dried. Any 4-nitrobenzyl 7-phenoxyacetamido-3-methyl-3-cephem-4-carboxylate (V), reversion product, was isolated by concentration of the filtrate and crystallized from 5 ml. of methanol. Yield data are summarized in Table I which follows.

TABLE I

| Reagent | Percent yield IV 7-amino nucleus ester salt | V amide |
|---|---|---|
| Water | --- | 89 |
| Methanol | 75 | 25 |
| Isopropanol | 62 | 35 |
| Tertiary-butanol | --- | 96 |
| Benzyl alcohol | 52 | 41 |
| p-Nitrobenzyl alcohol | 52 | 35 |
| p-Methoxybenzyl alcohol | --- | 91 |

It is evident from Table I that, depending upon the nature of the alcohol, the imino chloride can undergo cleavage to the nucleus ester or reversion to the amide.

Methanol concentration

Methanol and n-butanol are two alcohols which have been used most in prior art processes for the alcoholysis step of this process. In these reactions gross excesses of methanol and n-butanol are normally used. FIG. 1 is a graph showing that the amount of methanol required for optimum cleavage at 25° C. is 12.4 to 15 moles per mole of imino chloride.

EXAMPLE 2

Reaction technique

The Tables II (a) and II (b) of this example summarize and compare the data obtained by varying the method of addition of methanol at −10° C. to the imino chloride, using a mole ratio of 12.4 moles of methanol per mole of imino chloride, with the effects obtained using isobutanol according to this invention, on the yields of cleavage product IV regardless of how much imino chloride and alcohol are mixed.

TABLE II(a).—METHANOL (−10° C.)
[12.4 moles of methanol/mole of imino chloride]

| Technique | Percent cleavage IV | Percent reversion V |
|---|---|---|
| Normal addition: Rapid addition of methanol in one portion | 77.0 | 12.4 |
| Dropwise addition: Slow dropwise addition of methanol during 20-30 minutes | 61.2 | 31.8 |
| Inverse addition: Slow addition of imino chloride solution to methanol | 82.6 | 5.8 |

TABLE II(b).—ISOBUTANOL (25° C.)
[6 moles of isobutanol/mole of imino chloride]

| Technique | Percent cleavage IV | Percent reversion V |
|---|---|---|
| Normal addition: Rapid addition of methanol in one portion | 94 | --- |
| Dropwise addition: Slow dropwise addition of methanol during 20-30 minutes | 92 | --- |
| Inverse addition: Slow addition of imino chloride solution to methanol | 94 | --- |

EXAMPLE 3

This example shows the results obtained when the imino chloride, (I) prepared as described in Example 1, is reacted with a secondary alcohol at 25° C. The general structure for the secondary alcohols is as follows.

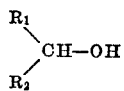

TABLE III

| Secondary alcohol | | Moles of alcohol | Percent cleavage IV | Percent reversion V |
|---|---|---|---|---|
| $R_1$ | $R_2$ | | | |
| $CH_3$ | $CH_3$ | 0.060 | 57 | 35 |
| $CH_3$ | $n\text{-}C_3H_7$ | 0.060 | --- | 84 |
| $-(-CH_2-)_4-$ | | 0.060 | 49 | 39 |
| $(-CH_2-)_5$ | | 0.060 | 63 | 25 |

The above table shows that secondary alcohols generally lead to more extensive reversion to acyl amide.

EXAMPLE 4

This example summarizes the yields of p-nitrobenzyl 7-amino - 3 - methyl-3-cephem-4-carboxylate hydrochloride (IV) obtained when the imino chloride of p-nitrobenzyl 7 - phenoxyacetamido - 3 - methyl-3-cephem-4-carboxylate (0.010 mole) in methylene chloride solution, prepared as described in Example 1 is reacted with various β-disubstituted primary aliphatic alcohols at 25° C.

TABLE IV.—B-BRANCHED PRIMARY ALIPHATIC ALCOHOLS AT 25° C.

$$\begin{array}{c} R_1 \\ \phantom{x}\diagdown{}^{\beta} \phantom{xxx}^{\alpha} \\ \phantom{xxxx}CH-CH_2-OH \\ \diagup \\ R_2 \end{array}$$

| $R_1$ | $R_2$ | Moles alcohol | Percent cleavage IV | Percent reversion V |
|---|---|---|---|---|
| CH$_3$— | CH$_3$— | 0.06 | 94 | (¹) |
| CH$_3$ | C$_2$H$_5$— | 0.06 | 92 | |
| C$_2$H$_5$ | C$_2$H$_5$ | 0.06 | 91 | |
| C$_2$H$_5$ | n-C$_4$H$_9$ | 0.06 | 92 | |
| —(—CH$_2$)$_4$— | | 0.05 | 91 | |
| —(—CH$_2$—)$_5$— | | 0.06 | 93 | |
| —B-furyl— | | 0.06 | 88 | |

¹ Indicates that no reversion product was isolated from the reaction mixture.

Table IV shows my discovery that β-branching of the primary aliphatic alcohol completely retards the reversion reaction in the alcoholysis of an imino halide. The yields of the cleavage product, p-nitrobenzyl 7-amino-3-methyl-3-cephem-4-carboxylate hydrochloride, IV, are over 90 percent.

EXAMPLE 5

This example illustrates the yields of cleavage product, p - nitrobenzyl 7 - amino - 3-methyl-3-cephem-4-carboxylate hydrochloride, obtainable using isobutyl alcohol at 25° C. in the cleavage process of this invention with various 7-acyl side chains on the desacetoxycephalosporin imino chloride ester.

In these runs a solution of 0.010 mole of the imino chloride of the p-nitrobenzyl ester of the indicated 7-acyl-amidodesacetoxycephalosporinate ester, prepared in a manner similar to that described in part A of Example 1, in 50 ml. of methylene chloride, was treated with 0.060 mole of isobutyl alcohol at 25° C. The mixture was stirred for 1 to 2 hours until the precipitation of the crystalline product was completed. The weight of crystalline product, p - nitrobenzyl 7 - amino-3-methyl-3-cephem-4-carboxylate hydrochloride, recovered was converted to percentage cleavage based on the weight of the 7-acylamidodesacetoxycephalosporinate ester that was used. The results were as follows:

| 7-acyl side chain | Percent cleavage |
|---|---|
| CH$_3$CO— | 95 |
| CH$_3$(CH$_2$)$_5$CO— | 97 |
| C$_6$H$_5$CH$_2$CO— | 93 |
| C$_6$H$_5$OCH$_2$CO— | 94 |
| —CH$_2$CO— | 95 |

I claim:

1. A process for preventing reversion of the imino halide of 7 - acylamidodesacetoxycephalosporin ester to the corresponding 7-acylamidodesacetoxycephalosporinate ester during treatment of the imino halide with alcohol or thiol which comprises reacting the imino halide in an inert organic liquid diluent in the presence of hydrogen halide with β-disubstituted primary aliphatic alcohol or thiol of the formula

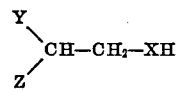

wherein X is oxygen or sulfur and (i) each of Y and Z is alkyl such that the alcohol or thiol has from 4 to about 12 carbon atoms, or (ii) Y and Z taken together with the carbon atom to which they are bonded are cycloalkyl having from 5 to 8 ring forming carbon atoms.

2. A process as defined in claim 1 wherein the imino halide is reacted with from 3 to 6 moles of the β-disubstituted primary aliphatic alcohol per mole of imino halide.

3. A process as defined in claim 2 wherein the β-disubstituted primary aliphatic alcohol is isobutanol.

4. A process as defined in claim 2 wherein the β-disubstituted primary aliphatic alcohol is 2-ethylhexanol.

5. A process as defined in claim 3 wherein the imino halide reactant is the imino chloride of the 7-acylamidodesacetoxycephalosporin ester.

6. A process as defined in claim 5 wherein the imino chloride of the 7-acylamidodesacetoxycephalosporinate ester is the imino chloride of p-nitrobenzyl 7-phenoxyacetamido - 3 - methyl-3-cephem-4-carboxylate to form as product p - nitrobenzyl 7-amino-3-methyl-3-cephem-4-carboxylate hydrochloride.

7. A process as defined in claim 5 wherein the imino chloride of the 7-acylamidodesacetoxycephalosporinate ester is the imino chloride of p-nitrobenzyl 7-phenylacetamido - 3 - methyl-3-cephem-4-carboxylate to form as product p - nitrobenzyl 7 - amino-3-methyl-3-cephem-4-carboxylate hydrochloride.

8. A process for preparing solid, crystalline p-nitrobenzyl 7-aminodesacetoxycephalosporinate hydrochloride which comprises reacting the imino chloride of p-nitrobenzyl 7 - acylamidodesacetoxycephalosporinate with from about 3 to 6 moles of isobutanol per mole of imino chloride, in an inert, organic liquid solvent, in the presence of hydrogen chloride.

9. A process as defined in claim 8 wherein the imino chloride reactant is the imino chloride of p-nitrobenzyl 7-phenoxyacetamidodesacetoxycephalosporinate.

10. A process as defined in claim 8 wherein the imino chloride reactant is the imino chloride of 7-phenylacetamidodesacetoxycephalosporinate.

11. A process for preparing 7 - aminodesacetoxycephalosporinate ester hydrohalide which comprises reacting the imino halide of 7-acylamidodesacetoxycephalosporinate ester in an inert, organic liquid solvent in the presence of hydrogen halide with β-disubstituted primary aliphatic alcohol or thiol of the formula

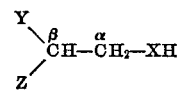

wherein X is oxygen and sulfur and (i) each of Y and Z is alkyl such that the alcohol or thiol has from 4 to about 12 carbon atoms, or (ii) Y and Z taken together with the carbon atom to which they are bonded are cycloalkyl having from 5 to 8 ring-forming atoms.

12. A process as defined in claim 10 wherein the imino halide is reacted with from 3 to 6 moles of the β-disubstituted primary aliphatic alcohol.

13. A process as defined in claim 12 wherein the β-disubstituted primary aliphatic alcohol is isobutanol.

14. A process as defined in claim 13 wherein the imino halide reactant is the imino chloride of 7-acylamidodesacetoxycephalosporinate ester.

15. A process as defined in claim 14 wherein the imino chloride of the 7-acylamidodesacetoxycephalosporinate ester is the imino chloride of p-nitrobenzyl 7-phenoxyacetamido-3-cephem-4-carboxylate to form as product p-nitrobenzyl 7 - amino - 3 - methyl-3-cephem-4-carboxylate hydrochloride.

16. A process as defined in claim 14 wherein the imino chloride of the 7 - acylamidodesacetoxycephalosporinate ester is the imino chloride of p-nitrobenzyl 7-phenylacetamido - 3 - methyl-3-cephem-4-carboxylate to form as product p - nitrobenzyl 7 - amino-3-methyl-3-cephem-4-carboxylate hydrochloride.

References Cited

UNITED STATES PATENTS

| | | |
|---|---|---|
| 3,499,909 | 3/1970 | Weissenburger et al. __ 260—243 C |
| 3,573,295 | 3/1971 | Johnson et al. _____ 260—243 C |
| 3,573,296 | 3/1971 | Johnson et al. _____ 260—243 C |
| 3,575,970 | 4/1971 | Weissenburger et al. __ 260—243 C |

NICHOLAS S. RIZZO, Primary Examiner

U.S. Cl. X.R.

260—239.1

PO-1050
(5/69)

UNITED STATES PATENT OFFICE
CERTIFICATE OF CORRECTION

Patent No. 3,845,043          Dated October 29, 1974

Inventor(s) Lowell D. Hatfield

Figure 3:
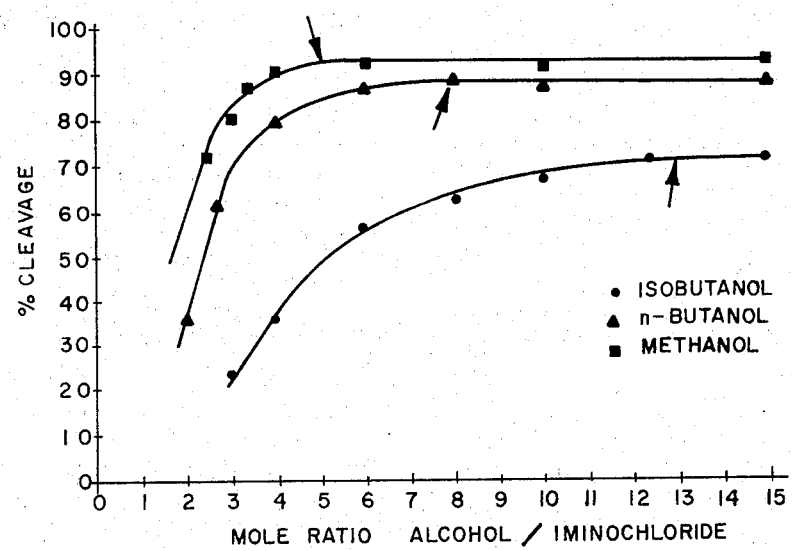
FIG. 3 is a graph plotting the mole ratio of alcohol/imino chloride (abscissa) against the percent cleavage obtained (ordinate) for methanol, n-butanol, and isobutanol. The arrows to points on each line depict the optimum mole ratio for each alcohol.
Figure 4:
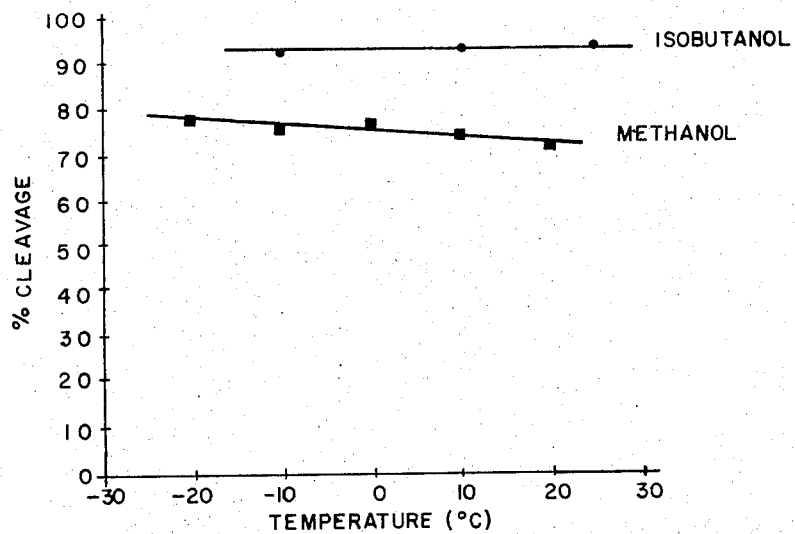
FIG. 4 is a graph plotting temperature in degrees Centigrade (abscissa) against percent cleavage product, (p-nitrobenzyl 7-amino-3-methyl-3-cephem-4-carboxylate hydrochloride) showing that while methanol (12.4 moles) gives a range of yields in the cleavage reaction depending upon temperature of alcoholysis, isobutanol (6 moles) functions equally well over the temperature range of −10° C. to 25° C.

It is certified that error appears in the above-identified patent and that said Letters Patent are hereby corrected as shown below:

In Figure 3, the symbol ■ designates isobutanol and the symbol ● designates methanol.

Column 1, line 66, "C-CH$_2$" should read -- C-CH$_3$ --.

Column 2, line 14, "C-CH$_2$" should read -- C-CH$_3$ --.

Column 6, line 50, "obtainel" should read --obtained--.

Column 9, line 25, "-(-CH$_2$)$_4$-" should read -- -(-CH$_2$-)$_4$- --.

Signed and sealed this 20th day of May 1975.

(SEAL)
Attest:

RUTH C. MASON
Attesting Officer

C. MARSHALL DANN
Commissioner of Patents
and Trademarks